(12) United States Patent
Southam et al.

(10) Patent No.: US 9,544,666 B2
(45) Date of Patent: Jan. 10, 2017

(54) AUTOMATED PRE AND POST ROLL PRODUCTION

(71) Applicant: ZEFR, Inc., Venice, CA (US)

(72) Inventors: Philip F. Southam, Stevenson Ranch, CA (US); Mike K. Goedecke, Santa Monica, CA (US)

(73) Assignee: ZEFR, INC., Venice, CA (US)

( * ) Notice: Subject to any disclaimer, the term of this patent is extended or adjusted under 35 U.S.C. 154(b) by 0 days.

(21) Appl. No.: 14/767,035

(22) PCT Filed: Feb. 11, 2014

(86) PCT No.: PCT/US2014/015689
§ 371 (c)(1),
(2) Date: Aug. 11, 2015

(87) PCT Pub. No.: WO2014/124414
PCT Pub. Date: Aug. 14, 2014

(65) Prior Publication Data
US 2016/0007098 A1    Jan. 7, 2016

Related U.S. Application Data

(60) Provisional application No. 61/763,024, filed on Feb. 11, 2013.

(51) Int. Cl.
*G06F 3/00*    (2006.01)
*H04N 7/173*    (2011.01)
(Continued)

(52) U.S. Cl.
CPC .......... *H04N 21/8545* (2013.01); *H04N 21/84* (2013.01); *H04N 21/858* (2013.01); *H04L 67/2804* (2013.01)

(58) Field of Classification Search
CPC .............. H04H 20/103; G06Q 30/0603; H04N 5/44543; H04N 21/4532; H04N 21/4722; H04N 21/4622
See application file for complete search history.

(56) References Cited

U.S. PATENT DOCUMENTS

2009/0280897 A1* 11/2009 Fitzmaurice ............ A63F 13/10
    463/30
2010/0050205 A1*  2/2010 Davis .................. G06Q 30/0603
    725/32

(Continued)

OTHER PUBLICATIONS

PCT/US2014/015689, International Search Report & Written Opinion, May 28, 2014.

*Primary Examiner* — Sumaiya A Chowdhury
(74) *Attorney, Agent, or Firm* — Kunzler Law Group

(57) ABSTRACT

For automated post roll production, a selection module 320 generates a link video list 240 from a video database 110. Each link video 200 in the link video list 240 includes at least one clip characteristic 215 matching a video characteristic of a target video 105 and each link video 200 is associated with a video clip 210 and a video address 205. The selection module 320 further selects a link video 200 from the link video list 240 according to a policy 115. A script generation module 325 generates a mask script 285 that specifies a mask dimension 415, a mask mark in 420, and a mask location 410 of the video clip 210 of the selected link video 200 within the target video 105. The script generation module 325 further generates an annotation script 280 that specifies a link location for a navigation link.

13 Claims, 20 Drawing Sheets

(51) Int. Cl.
  *H04N 21/8545* (2011.01)
  *H04N 21/84* (2011.01)
  *H04N 21/858* (2011.01)
  *H04L 29/08* (2006.01)

(56) References Cited

U.S. PATENT DOCUMENTS

2011/0010737 A1* 1/2011 Bouazizi ............. H04H 20/103
  725/34
2012/0011442 A1* 1/2012 Fay ...................... G11B 27/034
  715/723

* cited by examiner

285

405 — MaskType: Video

410 — MaskLocation: Clip Location

415 — MaskDimension: Clip Dimension

416 — MaskShape: Shape Data

417 — MaskMotion: Motion Mask

420 — MaskMarkIn: Clip Mark In

425 — MaskMarkOut: Clip Mark Out

280

430 — AnnotationType: Video

435 — AnnotationLocation: Link Location

440 — AnnotationDimension: Clip Dimension

441 — AnnotationMotion: Motion Data

445 — AnnotationMarkIn: Clip Mark In

450 — AnnotationMarkOut: Clip Mark Out

AUTOMATED PRE AND POST ROLL PRODUCTION

This application claims priority to U.S. Provisional Patent Application 61/763,024 entitled "AUTOMATED POST ROLL PRODUCT" and filed on Feb. 11, 2013 for Philip F. Southam, which is incorporated herein by reference.

FIELD

The subject matter disclosed herein relates to pre and post roll production and more particularly relates to automated pre and post roll production.

BACKGROUND

Description of the Related Art

Users enjoy viewing video clips of entertainment videos, and finding related videos to scenes, quotes, and the like. Directing users to related videos can increase views of those videos.

BRIEF SUMMARY

A method is disclosed for automated post roll production. A selection module generates a link video list from a video database. Each link video in the link video list includes at least one clip characteristic matching a video characteristic of a target video and each link video is associated with a video clip and a video address. The selection module further selects a link video from the link video list according to a policy. A script generation module generates a mask script that specifies a mask dimension, a mask mark in, and a mask location of the video clip of the selected link video within the target video. The script generation module further generates an annotation script that specifies a link location for a navigation link. A program product and apparatus that perform the functions of the method are also disclosed.

BRIEF DESCRIPTION OF THE DRAWINGS

In order that the advantages of the embodiments of the invention will be readily understood, a more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION OF THE INVENTION

Figure 1A:
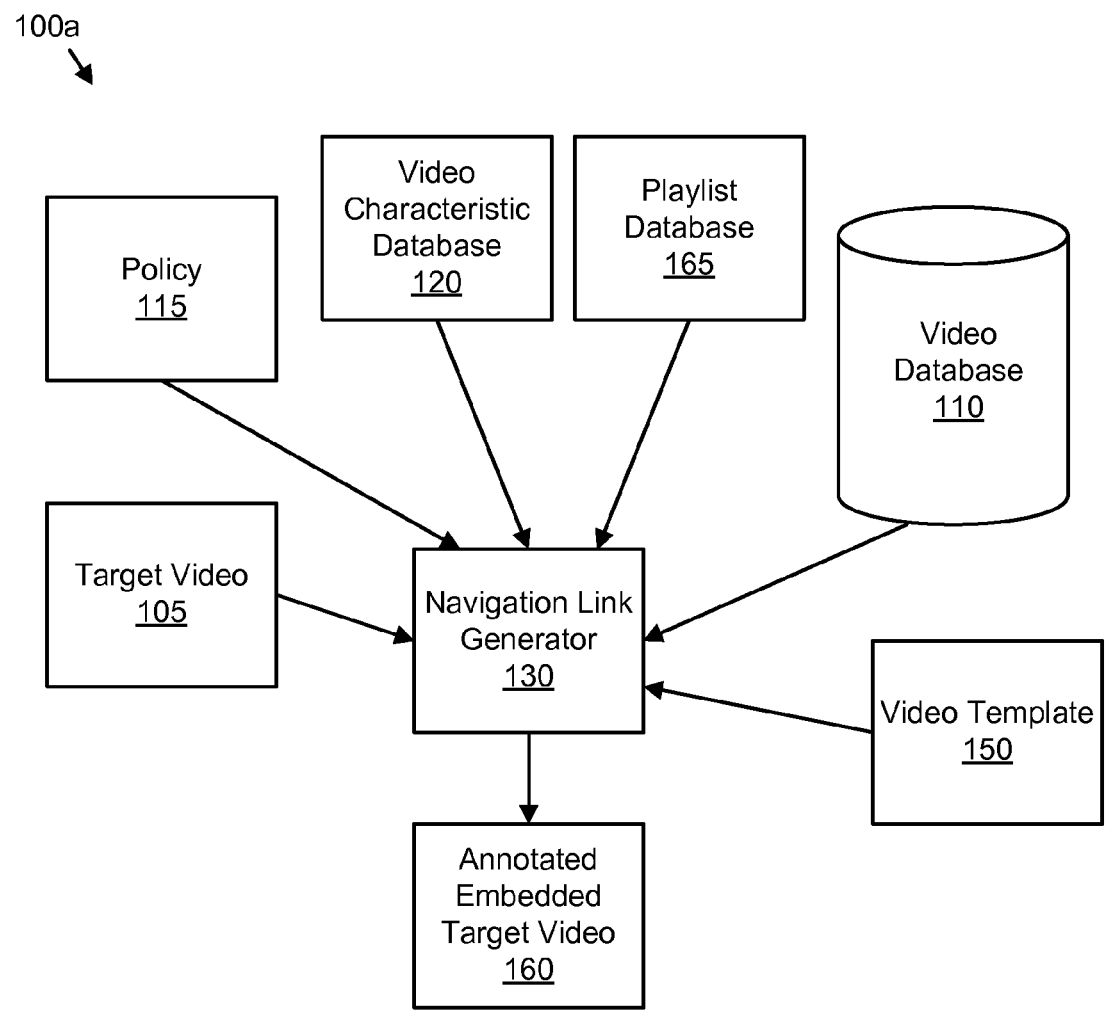
FIG. 1A is a schematic block diagram illustrating one embodiment of a post roll production system.

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise.

Furthermore, the described features, advantages, and characteristics of the embodiments may be combined in any suitable manner. One skilled in the relevant art will recognize that the embodiments may be practiced without one or more of the specific features or advantages of a particular embodiment. In other instances, additional features and advantages may be recognized in certain embodiments that may not be present in all embodiments.

These features and advantages of the embodiments will become more fully apparent from the following description and appended claims, or may be learned by the practice of embodiments as set forth hereinafter. As will be appreciated by one skilled in the art, aspects of the present invention may be embodied as a system, method, and/or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module," or "system." Furthermore, aspects of the present invention may take the form of a computer program product embodied in one or more computer readable medium(s) having program code embodied thereon.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of program code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of program code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. Where a module or portions of a module are implemented in software, the program code may be stored and/or propagated on in one or more computer readable medium(s).

The computer readable medium may be a tangible computer readable storage medium storing the program code. The computer readable storage medium may be, for example, but not limited to, an electronic, magnetic, optical, electromagnetic, infrared, holographic, micromechanical, or semiconductor system, apparatus, or device, or any suitable combination of the foregoing. The computer readable medium may be a non-transitory medium.

More specific examples of the computer readable storage medium may include but are not limited to a portable computer diskette, a hard disk, a random access memory (RAM), a read-only memory (ROM), an erasable programmable read-only memory (EPROM or Flash memory), a portable compact disc read-only memory (CD-ROM), a digital versatile disc (DVD), an optical storage device, a magnetic storage device, a holographic storage medium, a micromechanical storage device, or any suitable combination of the foregoing. In the context of this document, a computer readable storage medium may be any tangible medium that can contain, and/or store program code for use by and/or in connection with an instruction execution system, apparatus, or device.

Program code for carrying out operations for aspects of the present invention may be written in any combination of one or more programming languages, including an object oriented programming language such as Java, Smalltalk, C++, PHP, Python, Ruby, or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The computer program product may be shared, simultaneously serving multiple customers in a flexible, automated fashion. The computer program product may be standardized, requiring little customization and scalable, providing capacity on demand in a pay-as-you-go model.

The computer program product may be stored on a shared file system accessible from one or more servers. The computer program product may be executed via transactions that contain data and server processing requests that use Central Processor Unit (CPU) units on the accessed server. CPU units may be units of time such as minutes, seconds, hours on the central processor of the server. Additionally the accessed server may make requests of other servers that require CPU units. CPU units are an example that represents but one measurement of use. Other measurements of use include but are not limited to network bandwidth, memory usage, storage usage, packet transfers, complete transactions etc.

When multiple customers use the same computer program product via shared execution, transactions are differentiated by the parameters included in the transactions that identify the unique customer and the type of service for that customer. All of the CPU units and other measurements of use that are used for the services for each customer are recorded. When the number of transactions to any one server reaches a number that begins to affect the performance of that server, other servers are accessed to increase the capacity and to share the workload. Likewise when other measurements of use such as network bandwidth, memory usage, storage usage, etc. approach a capacity so as to affect performance, additional network bandwidth, memory usage, storage etc. are added to share the workload.

The measurements of use used for each service and customer are sent to a collecting server that sums the measurements of use for each customer for each service that was processed anywhere in the network of servers that provide the shared execution of the computer program product. The summed measurements of use units are periodically multiplied by unit costs and the resulting total computer program product service costs are alternatively sent to the customer and or indicated on a web site accessed by the customer which then remits payment to the service provider.

In one embodiment, the service provider requests payment directly from a customer account at a banking or financial institution. In another embodiment, if the service provider is also a customer of the customer that uses the computer program product, the payment owed to the service provider is reconciled to the payment owed by the service provider to minimize the transfer of payments.

The computer program product may be integrated into a client, server and network environment by providing for the computer program product to coexist with applications, operating systems and network operating systems software and then installing the computer program product on the clients and servers in the environment where the computer program product will function.

In one embodiment software is identified on the clients and servers including the network operating system where the computer program product will be deployed that are required by the computer program product or that work in conjunction with the computer program product. This includes the network operating system that is software that enhances a basic operating system by adding networking features.

In one embodiment, software applications and version numbers are identified and compared to the list of software applications and version numbers that have been tested to work with the computer program product. Those software applications that are missing or that do not match the correct version will be upgraded with the correct version numbers. Program instructions that pass parameters from the computer program product to the software applications will be checked to ensure the parameter lists match the parameter lists required by the computer program product. Conversely parameters passed by the software applications to the computer program product will be checked to ensure the parameters match the parameters required by the computer program product. The client and server operating systems including the network operating systems will be identified and compared to the list of operating systems, version numbers and network software that have been tested to work with the computer program product. Those operating systems, version numbers and network software that do not match the list of tested operating systems and version numbers will be upgraded on the clients and servers to the required level.

In response to determining that the software where the computer program product is to be deployed, is at the correct version level that has been tested to work with the computer program product, the integration is completed by installing the computer program product on the clients and servers.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and computer program products according to embodiments of the invention. It will be understood that each block of the schematic flowchart diagrams and/or schematic block diagrams, and combinations of blocks in the schematic flowchart diagrams and/or schematic block diagrams, can be implemented by program code. The program code may be provided to a processor of a general purpose computer, special purpose computer, sequencer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The program code may also be stored in a computer readable medium that can direct a computer, other programmable data processing apparatus, or other devices to function in a particular manner, such that the instructions stored in the computer readable medium produce an article of manufacture including instructions which implement the function/act specified in the schematic flowchart diagrams and/or schematic block diagrams block or blocks.

The program code may also be loaded onto a computer, other programmable data processing apparatus, or other devices to cause a series of operational steps to be performed on the computer, other programmable apparatus or other devices to produce a computer implemented process such that the program code which executed on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and computer program products according to various embodiments of the present invention. In this regard, each block in the schematic flowchart diagrams and/or schematic block diagrams may represent a module, segment, or portion of code, which comprises one or more executable instructions of the program code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and program code. The description of elements in each figure may refer to elements of proceeding figures. Like numbers refer to like elements in all figures, including alternate embodiments of like elements.

FIG. 1A is a schematic block diagram illustrating one embodiment of a post roll production system 100*a*. The system 100*a* includes a video database 110, a video characteristic database 120, a policy 115, a target video 105, a navigation link generator 130, a video template 150, a playlist database 165, and an annotated embedded target video 160.

Video content is very popular for online viewing. When a user views a video, the user often wants to view related video content. Embedded navigation links may be displayed within the borders of the video, and may be selected by selecting the navigation link within a portion of the video. Navigation links that are embedded in the original video content are readily noticed by the user. As a result, the user is more likely to see and select embedded navigation links.

Unfortunately, embedding and annotating navigation links within a video has been a time-consuming, manual process. Therefore, many videos that are provided by content hosts do not have annotated embedded navigation links. As a result, users are not directed effectively to related videos, particularly related videos that are supplied by the owner of the original video, diminishing revenues for the owner.

The embodiments described herein automatically generate scripts for rendering video clips embedded in the target video 105 and annotating embedded navigation links in the target video 105 to generate the annotated embedded target video 160. The video clips may be embedded and annotated pre and post roll relative to the target video 105. In addition, the embodiments may render video clips for the navigation links embedded within the target video 105 and annotate the embedded target video with the navigation links as will be described hereafter.

The video database 110 stores a plurality of link video entries. Each video entry describes a link video that may be linked to from the target video 105 with a navigation link. In addition, each link video may include a video clip and a video address. The link videos will be described in more detail hereafter. The video database 110 may be stored in a memory.

The video characteristic database 120 stores a plurality of video characteristics including a video characteristic of the target video 105. The video characteristics may include a brand, a target gender, a description, and the like for the target video 105. The video characteristics will be described in more detail hereafter. The video characteristic database 120 may be stored in a memory.

The video template 150 may specify clip dimensions, a clip frame rate, a clip mark in, a clip mark out, a clip location, and the like for rendering video clips within the target video 105. In one embodiment, the video template 105 may specify clip dimensions, clip frame rates, clip marks in, clip marks out, clip locations, and the like for a plurality of video formats, aspect ratios, and resolutions. For example, a video template 150 may support formats such as H.264, audio video interleaved (AVI), QuickTime, MP4, and the like. In addition, the video template may support aspect ratios such as 4:3 and 16:9. Furthermore, the video template 150 may support modes such as 1080p, 720p, 480p, and 360p.

The policy 115 may determine criteria for selecting link videos from the video database 110 for embedding in the target video 105. For example, the policy 115 may specify that popularity and/or high priority are used to select the link videos. In one embodiment, the policy 115 includes one or more selection algorithms. The policy 115 may be stored as a data structure in a memory.

The playlist database 165 stores a plurality of playlists. Each playlist may include one or more link videos. In one embodiment, the playlists are replicated on a content host. In a certain embodiment, the playlists are created on the content host and recorded in the playlist database 165. The playlist database 165 may be stored in a memory.

The target video 105 may be designated for posting to a content host. The content host may be a video host such as YOUTUBE®. In order to direct viewers of the target video 105 to desired related video content including link videos owned by the owner of the target video 105, the embodiments may generate a mask script for rendering the target video 105 with embedded video clips. In addition, the embodiments may generate an annotation script is used to annotate the embedded target video with the navigation links.

The navigation link generator 130 automatically generates a link video list from the video database 110 and video characteristics for the target video 105. The navigation link generator 130 may further select link videos from the link video list to add to the target video 105 to generate an embedded target video. In one embodiment, the navigation link generator 130 selects the link videos based on the policy 115. The navigation link generator 130 may further generate a mask script and an annotation script using selected link videos and the video template 105 and generate the annotated embedded target video 160. The generation of the annotated embedded target video 160 is described in more detail hereafter.

Figure 1B:
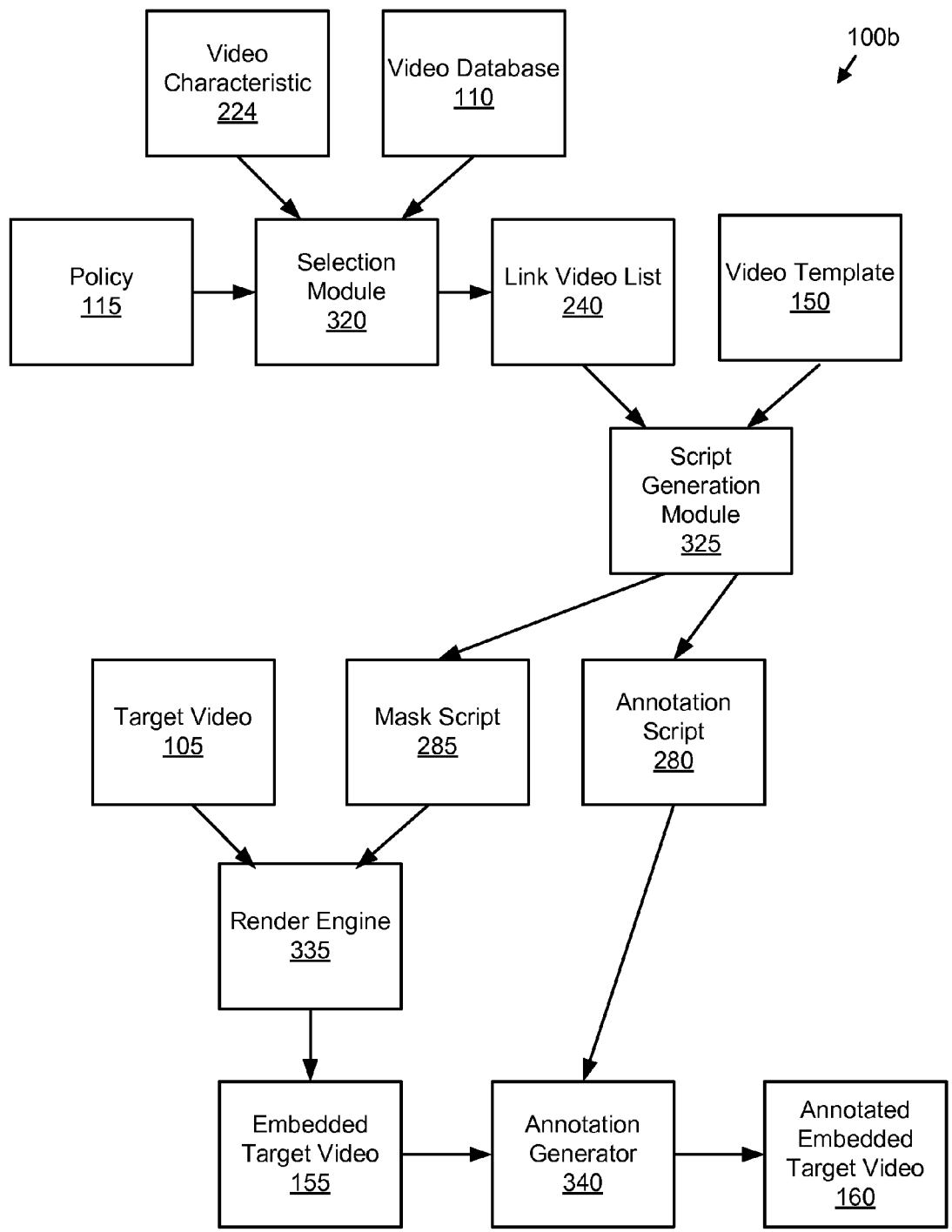
FIG. 1B is a schematic block diagram illustrating one alternate embodiment of a post roll production system.

FIG. 1B is a schematic block diagram illustrating one alternate embodiment of a post roll production system 100b. In the depicted embodiment, the process flow is shown. A selection module 320, a script generation module 325, a render engine 335, and an annotation generator 340 of the navigation link generator 130 are depicted performing operations on a video characteristic 224, the video database 110, the video template 150, a linked video list 240, the target video 105, the mask script 285, the annotation script 280, an embedded target video 155, and the annotated embedded target video 160.

The selection module 320 receives the video characteristics 224 for the target video 105. The selection module 320 further generates the link video list 240 from the video database 110. Each link video in the link video list 240 may comprise at least one clip characteristic matching the video characteristic 224 of the target video 150.

In one embodiment, the selection module 320 selects the link video list 240 in response to the policy 115. In one embodiment, the policy 115 selects the link video list 240 based on whether a link video is a current video, a popular video, and/or includes a high priority characteristic as will be described hereafter in FIGS. 9A-B.

In one embodiment, the selection module 320 selects one or more link videos from the link video list 240. The selection module 320 may select the link videos according to the policy 115. In a certain embodiment, the selection of the link videos is described in greater detail in FIGS. 9A-B.

The script generation module 325 generates the mask script 285 using the selected link videos and the video template 150. The mask script 285 may specify mask locations for the selected link videos in the embedded target video 155. In addition, the script generation module 325 generates the annotation script 280 from the selected link videos and the video template 150. The annotation script 280 may specify annotation locations of navigation links corresponding to video clips of the selected link videos in the annotated embedded target video 160.

The render engine 335 may render video clips of the selected link videos embedded within the target video 150 to generate the embedded target video 155 in response to the mask script 285. In one embodiment, the embedded target video 155 and the annotation script 280 are communicated to the annotation generator 340. In a certain embodiment, the annotation generator 340 is embodied within the content host. The annotation generator 340 may annotate the embedded target video 155 with the video address of each link video at the corresponding annotation location in response to the annotation script 280.

Figure 1C:
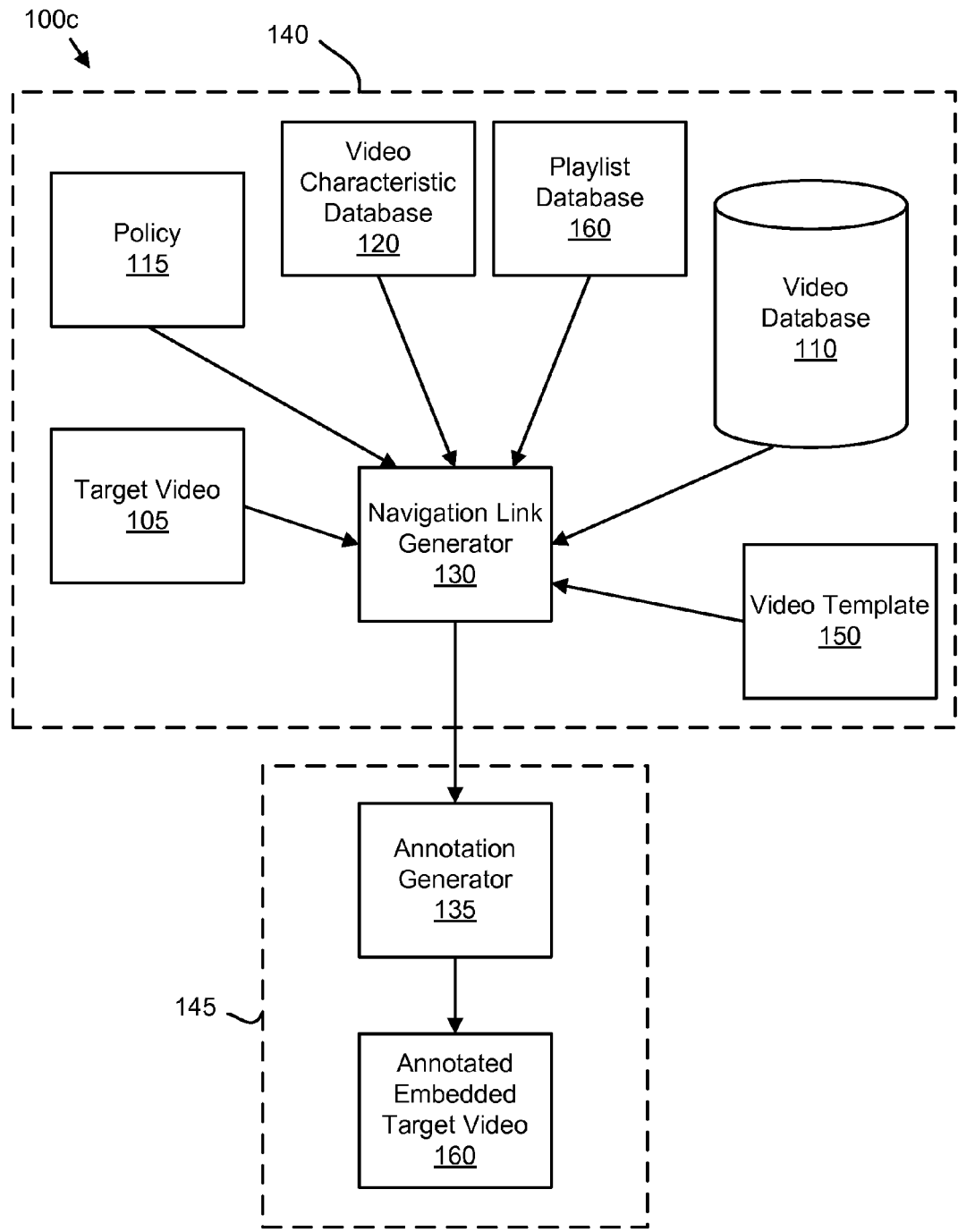
FIG. 1C is a schematic block diagram illustrating one alternate embodiment of a post roll production system.

FIG. 1C is a schematic block diagram illustrating one alternate embodiment of a post roll production system 100*c*. The post roll production system 100*a* of FIG. 1A is depicted. In addition, a content host 145 and a content provider 140 are shown. The target video 105, policy 115, video characteristic database 120, playlist database 160, video database 110, video template 150, and navigation link generator 130 may be embodied wholly or in part within the content provider 140. In addition, the annotation generator 135 and the annotated embedded target video 160 may be embodied within the content host 145.

Figure 2A:
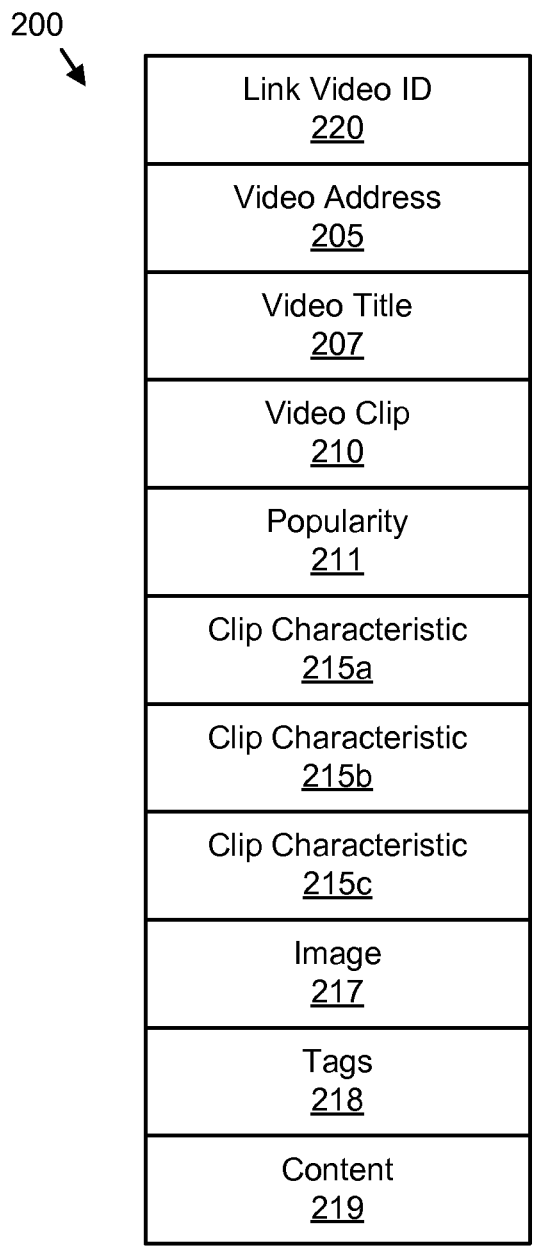
FIG. 2A is a schematic block diagram illustrating one embodiment of a link video.

FIG. 2A is a schematic block diagram illustrating one embodiment of a link video 200. The video database 110 may store a plurality of link videos 200. The link video 200 may be stored as an entry in the video database 110. Alternatively, the link video may be stored as a data structure, a flat file, a spreadsheet, or the like.

The plurality of link videos 200 may be stored in the video database 110. The link video 200 includes a link identifier 220, a video address 205, a video title 207, a video clip 210, a popularity 211, one or more clip characteristics 215, an image 217, tags 218, and content 219.

The link video identifier 220 may be an index number that uniquely identifies the link video 200. The video address 205 may be a Universal Resource Locator (URL), a content host index number, or the like. For example, the video address 205 may be a YOUTUBE® index number. The video title 207 may be the title of the link video 200. Alternatively, the video title 207 may be a title of the video clip 210. The title of the video clip 210 may be used to further distinguish the contents of the link video 200.

The video clip 210 may include a video file, a pointer to the video file, and the like. In addition, the video clip 210 may include a format, a mode, a frame rate, a pixel ratio, and a dimension of the link video 200. The popularity 211 may be calculated as a function of likes, comments, views, or combinations thereof. For example, the more likes, comments, and views the link video 200 receives, the higher the calculated popularity 211.

The clip characteristics 215 describe characteristics of the link video 200. Table 1 lists clip characteristics 215 and descriptions of the clip characteristics 215. One of skill in the art will recognize that the embodiments may be practiced with other characteristics, and of the characteristics described herein are not limiting. Each clip characteristic 215 may include a characteristic type as will be described hereafter for FIG. 2E.

TABLE 1

| Characteristic | Description |
| --- | --- |
| Actor | Each actor appearing in the link video 200. |
| Actor's Other Works | Other works such as movies, commercials, television series, and the like in which each actor appeared. |
| Brand | A brand associated with the link video 200 |
| Director | The director of the link video 200 |
| Director's Other Works | Other works by the director of the link video 200 |
| Scene Name | One or more name scenes for the link video 200 |
| Scene Type | A type of each scene in the link video 200 |
| Genre | A genre of the link video 200 |

TABLE 1-continued

| Characteristic | Description |
| --- | --- |
| Sub Genre | A sub genre of the link video 200 |
| Product placement | A product placement within the link video 200 including the name of the product and location within the link video 200, |
| Poster | An image of a promotional medium and/or a link to a promotional medium for the link video 200 |
| Dialog segment | A dialogue segment representative of the link video 200 |
| Promotion | A promotion related to the link video 200 |
| Trailer | A link to a trailer for the link video 200 |
| Award | A list of one or more awards related to the link video 200 |

In one embodiment, the image 217 is a still image associated with the link video 200. The tags 218 may include one or more tag descriptions associated with the link video 200. Each tag may describe a group of related videos. The content 219 may further describe the content with the link video 200.

Figure 2B:
FIG. 2B is a schematic block diagram illustrating one embodiment of a video characteristic.

FIG. 2B is a schematic block diagram illustrating one embodiment of a video characteristic 224 for a target video 105. The video characteristic database 120 may store a plurality of video characteristics 224 for a plurality of target videos 105. Each video characteristic 224 may include a target video identifier 222, a target gender 241, a target playlist 243, a language 245, a preview length 247, a preview start time 248, a channel 249, a target title 251, a target description 253, target tags 255, related videos 257, a related genre 259, and a brand 261. In addition, the video characteristic 224 may include one or more content characteristics 232, a target dimension 265, a target format 266, a target pixel ratio 267, and a target frame rate 269. The target video identifier 222 may comprise an index number, a text description, and the like.

The target video identifier 222 may uniquely identify the target video 105. The target video identifier 222 may comprise an index to the target video 105 at the content host 145. The gender 241 may specify a target gender for the target video 105. The target playlist 243 may specify one or more playlists that the target video 105 will be added to. The language 245 may specify one or more languages of the target video 105.

The preview length 247 may specify a duration of a preview for the target video 105. The preview start time 248 may specify a start time for the preview of the target video 105. The duration and/or start time may be measured in seconds. Alternatively, the duration and/or start time may be measured in frames.

The channel 249 may specify one or more content host channels of the content host 145 that the target video 105 will be added to. The target title 251 may be the title of the target video 105. The target description 253 may describe the target video 105. The target tags 255 may specify one or more tags that are associated with the target video 105.

The related videos 257 may specify one or more videos that are related to the target video 105. In one embodiment, the related videos 257 are automatically identified from the target tags 255. The related genre 259 may specify one or more genres that are related to the target video 105. The related genres 259 may be automatically generated as a function of the target tags 255.

The brand 261 maybe a brand associated with the target video 105. The brand 261 may be identified by an administrator. Alternatively, the brand 261 may be parsed from the target video 105. For example, a branded product may be identified within the target video 105 and the brand 261 parsed from the branded product. The content characteristics 263 maybe comprise one or more characteristics of Table 1.

The target dimension 265 may specify the dimension of the target video 105. In one embodiment, the target dimension 265 includes a video mode. The target format 266 may specify a video format for the target video 105. The target pixel ratio 267 may specify the pixel ratio of the target video 105. The target frame rate 269 may specify the frame rate of the target video 105.

Figure 2C:
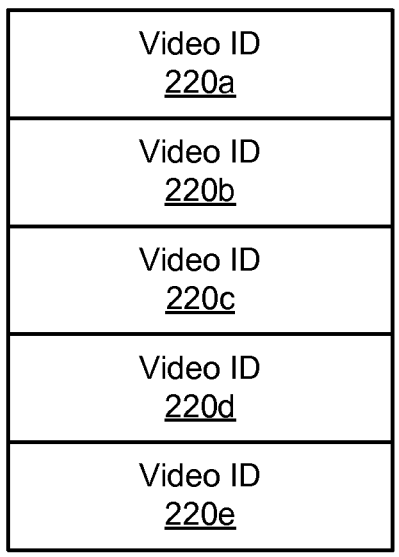
FIG. 2C is a schematic block diagram illustrating one embodiment of a link video list.

FIG. 2C is a schematic block diagram illustrating one embodiment of a link video list 240. The link video list 240 may be stored in a data structure of a memory. The navigation link generator 130 may generate the link video list 240 from link videos 200 with clip characteristics 215 that match the video characteristics 224 for the video database entry 224 of the target video 105 as will be described hereafter in FIGS. 9A-B.

Figure 2D:
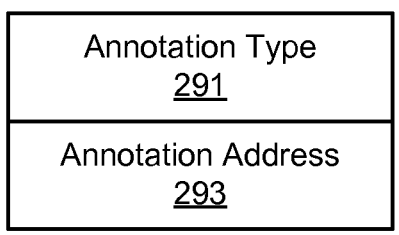
FIG. 2D is a schematic block diagram illustrating one embodiment of an annotation destination.

FIG. 2D is a schematic block diagram illustrating one embodiment of an annotation destination 290. The annotation destination 290 may be stored in a data structure of a memory. In the depicted embodiment, the annotation destination 290 includes an annotation type 291 and an annotation address 293. The annotation type 291 may specify a type of navigation link. The annotation type 291 may be one of the playlist type, a channel type, a page type, a profile type, a subscription type, and a project type.

The playlist type may link to a play list such as a play list of video content on the content host 145. The channel type may link to a channel such as a channel of video content on the content host 145. The page type may link to a page such as a webpage. The webpage may be a landing page hosted by the content host 145. The profile type may link to a profile such as a profile of the content provider 140, a brand, or the like. The profile may be hosted by the content host 145. The subscription type may link to a subscription option that allows a user to subscribe to a channel. In addition, the project type may link to a project such as a charitable and/or fund raising project.

The annotation address 293 includes a navigation link. The configuration of the annotation address 293 may be a function of the annotation type 291. In one embodiment, the annotation address 293 is a navigation link within the content host 145. For example, the navigation link may be an index to a video with the content host 145.

Figure 2E:
FIG. 2E is a schematic block diagram illustrating one embodiment of a clip characteristic priority table.

FIG. 2E is a schematic block diagram illustrating one embodiment of a clip characteristic priority table 295. The table 295 may be stored in a data structure of a memory. The table 295 includes a plurality of characteristic types 296. A priority 297 is assigned to each characteristic type 296. The table 295 may be used to determine the priority 297 of clip characteristics 215. For example, a characteristic type 296 may be assigned to each clip characteristic 215. In addition, the priority 297 corresponding to the characteristic type 296 may be assigned to the clip characteristic 215. The table 295 may be consulted to determine the priority of each clip characteristic 215.

Figure 3A:
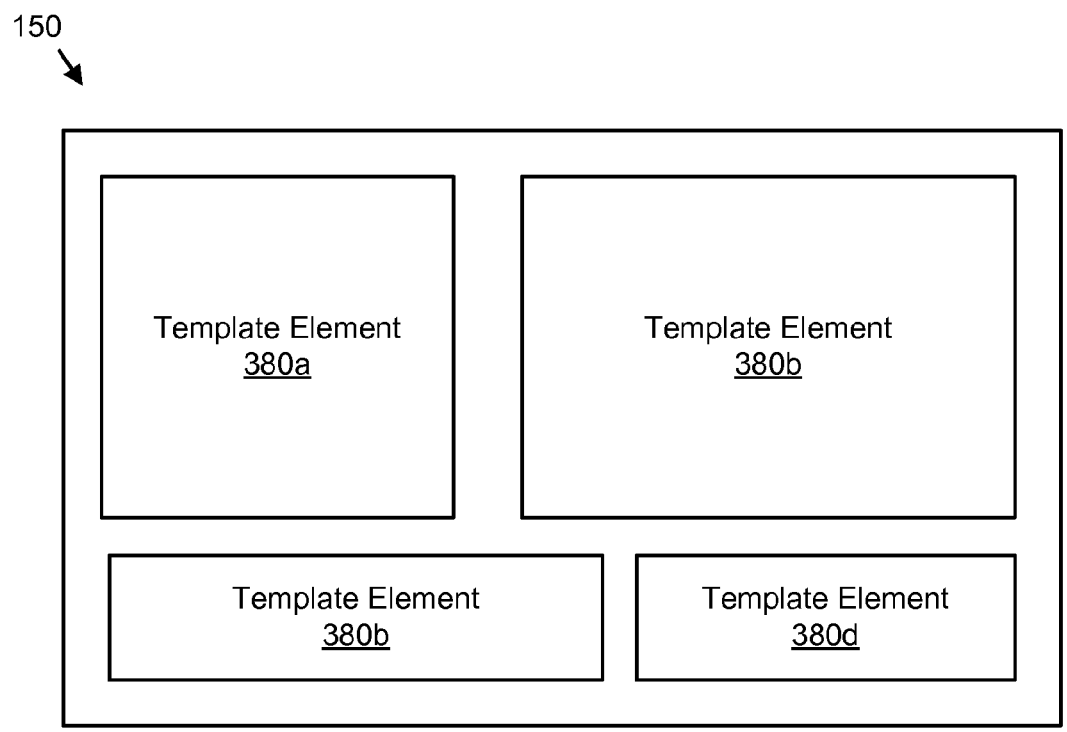
FIG. 3A is a schematic block diagram illustrating one embodiment of a video template.

FIG. 3A is a schematic block diagram illustrating one embodiment of the video template 150. The video template 150 describes one or more template elements 380 that will be used as masks within a video frame for embedding video clips 210 in the target video 105. The target elements 380 may be any shape. In addition, the target elements 380 may move dynamically within the video template 150. In one embodiment, the script generation module 325 generates the video template 150. In one embodiment, a template element 380 includes a pagination control. In addition, a template element 380 may include one or more of a search control, cover, and a notice.

Figure 3B:
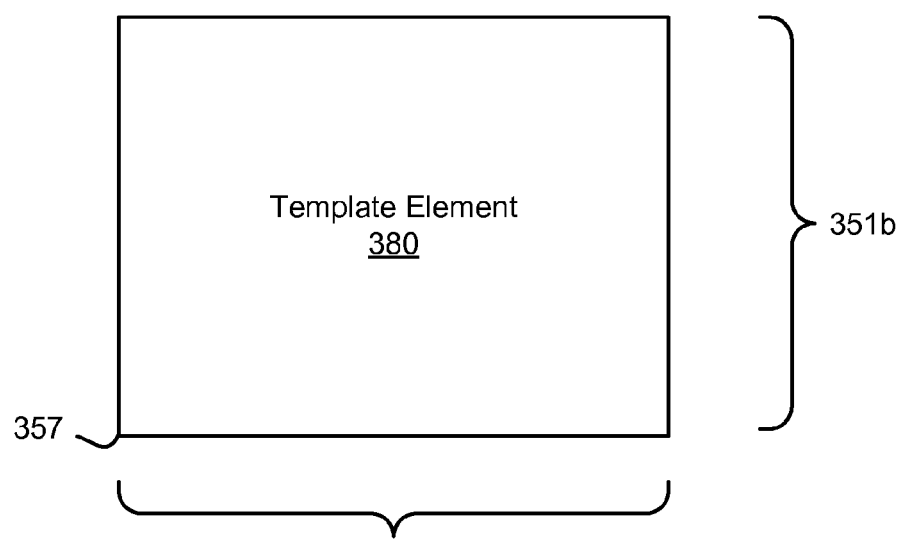
FIG. 3B is a schematic block diagram illustrating one embodiment of a template element.

FIG. 3B is a schematic block diagram illustrating one embodiment of a template element 380. The target element 380 may include clip dimensions 351 and a clip location 357. The clip dimensions 351 may include a horizontal dimension 351a and a vertical dimension 351b. Although the clip location 357 is depicted is measured from a lower left corner of the template element 380, the clip location 357 may be specified anywhere relative to the template element 380 and/or the video template 150.

Figure 3C:
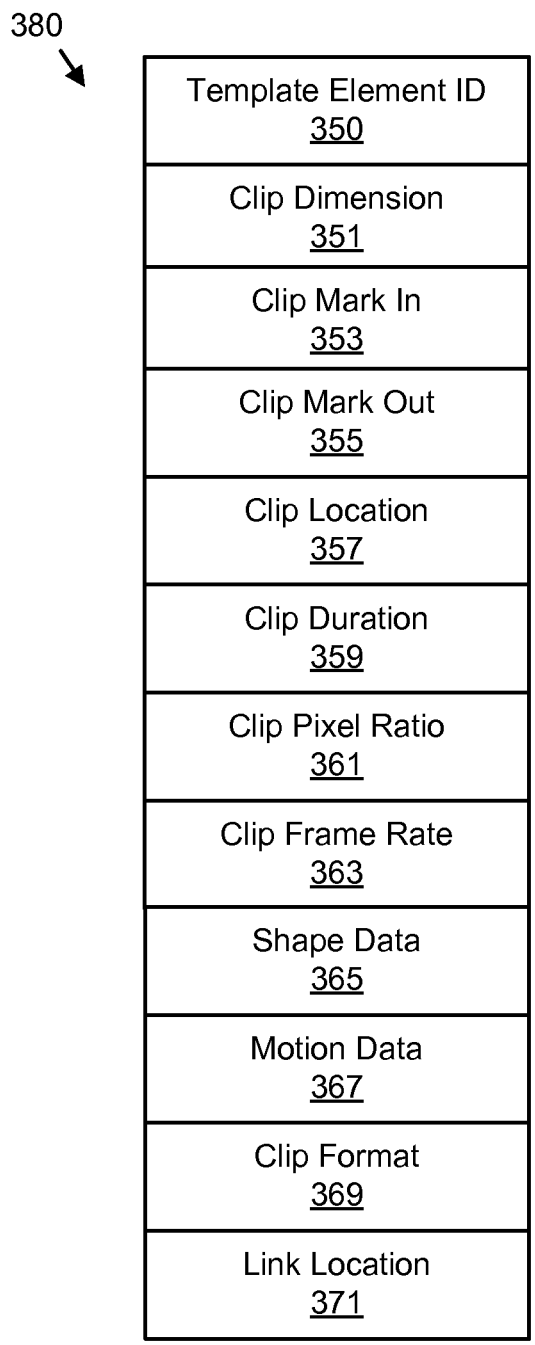
FIG. 3C is a schematic block diagram illustrating one alternate embodiment of a template element.

FIG. 3C is a schematic block diagram illustrating one alternate embodiment of a template element 380. In the depicted embodiment, the template element 380 is a data set. The template element 380 includes a template element identifier 350, the clip dimensions 351, a clip mark in 353, a clip mark out 355, the clip location 357, a clip duration 359, a clip pixel ratio 361, a clip frame rate 363, shaped data 365, motion data 367, a clip format 369, and a link location 371.

The clip dimensions 351 may include a video mode. The clip mark in 353 may specify when a video clip 210 marks in when rendered embedded in the target video 105. The clip mark out 355 may specify when the video clip 210 marks out when rendered embedded in the target vide 105. The clip duration 351 may be a time interval between the clip mark in 353 and the clip mark out 355.

The shape data 365 may describe the shape of the template element 380. The motion data 369 may describe a motion of the template element 380 when rendered. For example, the template element 380 may specify that the video clip 210 is rendered within an oval shape that changes position within the target video using the shape data 365 and the motion data 367. The clip format 369 may specify a video format for the clip used with the template element 380. The link location 371 may specify a location of a navigation link. In one embodiment, the link location 371 is the clip location 357.

Figure 3D:
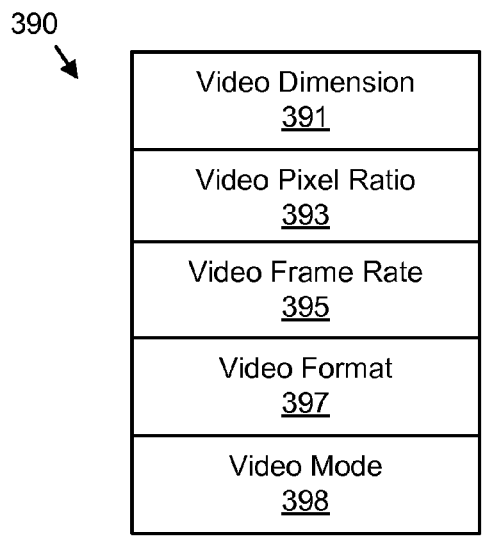
FIG. 3D is a schematic block diagram illustrating one embodiment of embedded target video data.

FIG. 3D is a schematic block diagram illustrating one embodiment of embedded target video data 390. The embedded target video data 390 may specify parameters for the embedded target video 155. The embedded target video data 390 includes a video dimension 391, a video pixel ratio 393, a video frame rate 395, a video format 397, and a video mode 398. The video pixel ratio 393 may be 16:9, 4:3, or the like. The video frame rate 395 may be 24 frames/second, 30 frames/second, or the like. The video format 397 may be H.264, AVI, QuickTime, MP4, and the like. The video mode may be 1080p, 720p, 480p, and 360p, or the like.

Figure 4A:
FIG. 4A is a text diagram illustrating one embodiment of a mask script.

FIG. 4A is a text diagram illustrating one embodiment of the mask script 285. The mask script 285 is depicted in pseudo-code that is illustrative of a script file. One of skill in the art will recognize that the mask script 285 may be written with a variety of formats and programming languages. The mask script 285 describes a mask that will be rendered with the target video 105 to generate the embedded target video 155. In the depicted embodiment, the mask script 285 includes a mask type 405, a mask location 410, a mask dimension 415, a mask shape 416, a mask motion 417, a mask mark in 420, and a mask mark out 425.

The mask type 405 may specify whether a video, an image, text, fill, or combinations thereof are embedded within the target video 105 as the embedded target video 155. In the depicted embodiment, a video will be embedded in the target video 105 as part of a mask. For example, the script generation module 325 may indicate that the mask type 405 is a video in response to embedding a video clip 210. Alternatively, the script generation module 325 may embed a cover or a notice, and so may set the mask type of 405 to an image, text, fill, or combinations thereof.

The mask location 410 may specify where the mask will be embedded in the target video 105. In the depicted embodiment, the mask location 410 is set to the clip location 357. The clip location 357 may be expressed in pixel dimensions from an origin.

Alternatively, a value may be calculated for the mask location 410 from the clip location 357. For example, the clip location 357 may be expressed as a percentage of the horizontal and vertical dimensions of the video dimension 391. The script generation module 325 may calculate a value for the mask location 410 using the video dimension 391 and clip location 357.

The mask dimension 415 may specify a dimension of the mask embedded within the target video 105. In the depicted embodiment, the mask dimension 415 is set to the clip dimension 351. The clip dimension 351 may be horizontal and vertical dimensions measured in pixels.

In one embodiment, the mask dimension 415 is calculated as a function of the clip dimension 351, the pixel ratio 361, and the video pixel ratio 393. The script generation module 325 may crop a link video to conform to the clip dimension 351 and the video pixel ratio 393.

The mask shape 416 may specify a shape of the mask. The vale assigned to the mask shape 416 may be the shape data 365. The mask motion 417 may specify a motion of the mask. The value assigned to the mask motion 417 may be the motion data 367.

The mask mark in 420 may specify when the mask first appears embedded in the target video 105. The mask mark out 425 may specify when the mask no longer appears embedded in the target video 105. The mask mark out 425 may be the clip mark out 355. Alternatively, the mask mark out 425 may be calculated from the clip mark in 353 and the clip duration 359. The mask mark in 420 and the mask mark out 425 may be a value measured in seconds. Alternatively, the mask mark in 420 and the mask mark out 425 may be a value measured in frames.

Figure 4B:
FIG. 4B is a text diagram illustrating one embodiment of an annotation script.

FIG. 4B is a text diagram illustrating one embodiment of the annotation script 280. The annotation script 280 is shown written in a pseudo-code that is illustrative of a script file. One of skill in the art will recognize that the annotation script 280 may be written with a variety of formats and programming languages. The annotation script 280 may include an annotation type 430, an annotation location 435, an annotation dimension 440, an annotation motion 441, an annotation mark in 445, and an annotation mark out 450.

The annotation type 430 may specify the type of the annotation. The annotation type 430 may be playlist type, a channel type, a page type, a profile type, a subscription type, and a project type. The annotation type 430 may be specified by the annotation type 291.

The annotation location 435 may specify where the annotation will be located on the annotated embedded target video 160. In the depicted embodiment, the annotation location 435 is set to the link location 371. The link location 371 may be the clip location 357. The annotation location 435 may be expressed in pixel dimensions from an origin.

Alternatively, a value may be calculated for the annotation location 435 from the clip location 357. For example, the clip location 357 may be expressed as a percentage of the horizontal and vertical dimensions of the video dimension 391. The script generation module 325 may calculate a value for the annotation location 440 using the video dimension 391 and clip location 357.

The annotation dimension 440 may specify a dimension of the annotation overlaid on the annotated embedded target video 160. In the depicted embodiment, the annotation dimension 440 is set to the clip dimension 351. The clip dimension 351 may be horizontal and vertical dimensions measured in pixels. In one embodiment, the annotation dimension 440 is calculated as a function of the clip dimension 351, the pixel ratio 361, and the video pixel ratio 393.

The annotation motion 441 may describe a motion of the annotation overlaid on the annotated embedded target video 160. The value associated with the annotation motion 441 may be generated from the motion data 367.

The annotation mark in 445 may specify when the annotation first appears on the annotated embedded target video 160. The annotation mark out 450 may specify when the annotation no longer appears on the annotated embedded target video 160. The annotation mark in 445 may be set to the clip mark in 353. In addition, the annotation mark out may be set to the clip mark out 355. Alternatively, the annotation mark out may be set to a sum of the clip mark in 353 and the clip duration 359. The annotation mark in 445 and annotation mark out 450 may be a value measured in seconds. Alternatively, the annotation mark in 445 and annotation mark out 450 may be a value measured in frames.

Figure 5:
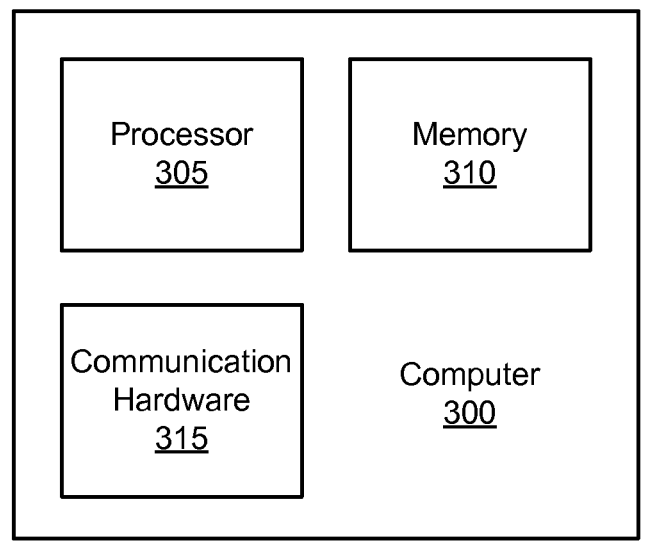
FIG. 5 is a schematic block diagram illustrating one embodiment of a computer.

FIG. 5 is a schematic block diagram illustrating one embodiment of a computer 300. The computer 300 includes a processor 305, a memory 310, and communication hardware 315. The memory 310 may be a semiconductor storage device, a hard disk drive, an optical storage device, or the like. The memory 310 may store program code. The memory 310 may be a computer readable storage medium. The processor 305 may execute the program code to perform the embodiments. The communication hardware 315 may communicate with other devices.

Figure 6:
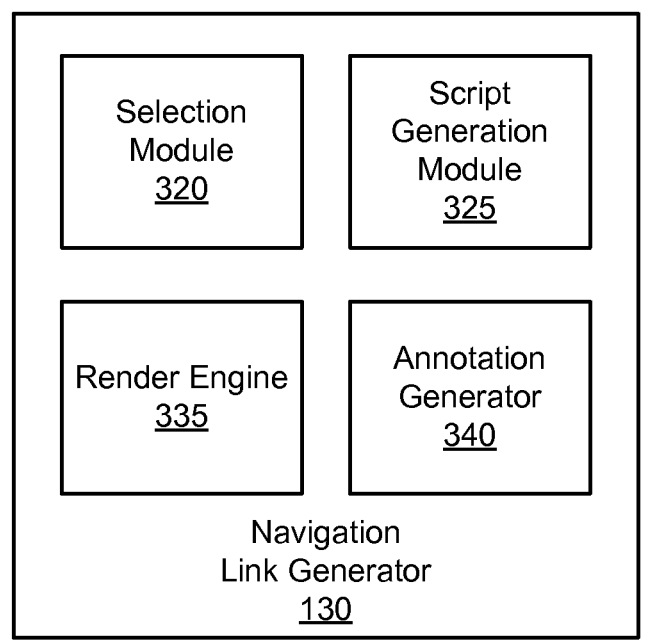
FIG. 6 is a schematic block diagram illustrating one embodiment of a navigation link generator.

FIG. 6 is a schematic block diagram illustrating one embodiment of the navigation link generator 130. The navigation link generator 130 includes the selection module 320, the script generation module 325, and the render engine 335. In one embodiment, the navigation link generator 130 includes the annotation generator 340. Alternatively, the annotation generator 340 may be separate from the navigation link generator 130. The selection module 320, the script generation module 325, the render engine 335, and the annotation generator 340 may be embodied in a computer readable storage medium such as the memory 310. The computer readable storage medium may store program code that is executed by the processor 305 to perform the functions of the navigation link generator 130. In addition, the selection module 320, the script generation module 325, the render engine 335, and the annotation generator 340 may be embodied in one or more computers 300.

The selection module 320 further generates the link video list 240 from the video database 110. The script generation module 325 generates the mask script 285 using the selected link videos and the video template 150. In addition, the script generation module 325 generates the annotation script 280 from the selected link videos and the video template 150.

The render engine 335 may render video clips of the selected link videos embedded within the target video 105 to generate the embedded target video 155 in response to the mask script 285. The annotation generator 340 may annotate the annotated embedded target video 160 with a navigation link at the corresponding link location in response to the annotation script 280.

Figure 7:
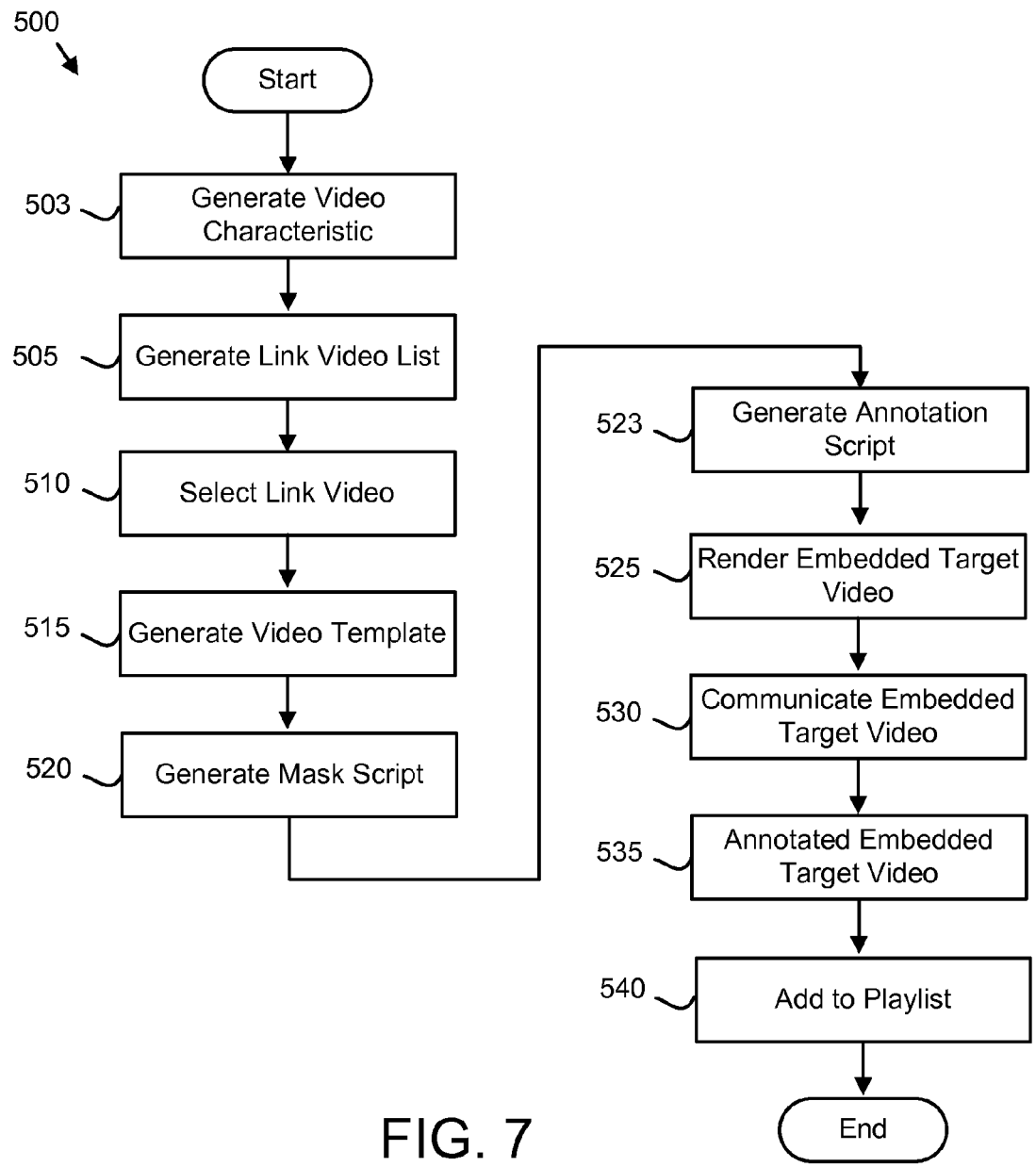
FIG. 7 is a schematic flow chart diagram illustrating one embodiment of a post roll production method.

FIG. 7 is a schematic flow chart diagram illustrating one embodiment of a post roll production method 500. The method 500 may be performed by the processor 305. Alternatively, the method 500 may be performed by a computer program product comprising a computer readable storage medium such as the memory 310 storing program code that is executable by the processor 305 to perform the functions of the method 500.

The method 500 starts, and in one embodiment, the selection module 320 generates 503 the video characteristic 224 for the target video 105. In one embodiment, the selection module 320 generates 503 the video characteristic from one or more administrator inputs. The administrator inputs may include the video address 205, and the video clip 210. In addition, the administrator inputs may include one or more clip characteristics 215, the video title 207, the image 217, the tags 218, and the content 219. In one embodiment, the selection module 320 may parse the target video 105 to identify one or more clip characteristics 215, the video title 207, the image 217, the tags 218, and the content 219.

In one embodiment, the selection module 320 generates 505 the link video list 240 from the video database 110. The selection module 320 may select the link video list 240 in response to the policy 115. In one embodiment, the policy 115 generates 505 the link video list 240 based on whether a link video 200 is a current video, a popular video, and/or includes a high priority characteristic. The generation of the link video list 240 is described in greater detail in FIGS. 9A-B.

The selection module 320 further selects 510 one or more link videos 200 from the link video list 240. The one or more link videos 200 may be selected in response to the policy 115. The policy 115 may select the highest ranking link videos from the link video list 240. The link video list 240 may be sorted by current video, popular video, and high priority characteristic as is described in FIGS. 9A-B.

In one embodiment, the script generation module 325 generates 515 the video template 150. The video template 150 may be generated in response to an administrator input. In addition, the video template 150 may be generated in response to a number of selected link videos 200. For example, the video template 150 may be automatically generated with template elements 380 equal to the number of selected link videos 200 to support embedding each of the link videos 200 in the target video 105.

The script generation module 325 generates 520 the mask script 285 using the selected link videos 200 and the video template 150. In one embodiment, the script generation module 325 calculates modifications to the target dimension 265, the target format 266, the target pixel ratio 267, and the target frame rate 269 to conform to the video dimension 391, video format 397, video mode 398, video pixel ratio 393, and video frame rate 395. In addition, the script generation module 325 may employ the clip dimension 351, the clip mark in 353, the clip mark out 355, the clip location 357, the clip duration 359, shape data 365, and/or motion data 367 to generate the mask script 285.

In one embodiment, the script generation module 325 generates 523 the annotation script 280 from the selected link videos 200 and the video template 150. The script generation module 325 may employ the clip dimension 351, the clip mark in 353, the clip mark out 355, the clip location 357, the clip duration 359 and/or motion data 367 to generate 523 the annotation script 280.

The render engine 335 may render 525 video clips 210 of the selected link videos embedded within the target video 150 to generate 525 the embedded target video 155 in response to the mask script 285. The render engine 335 may receive the mask script 285. In addition, the render engine 335 may access the target video 105 and the link videos 200 in response to the mask script 285.

In one embodiment, the render engine 335 renders 525 the target video 105 as a background for the embedded target video 155. In addition, the render engine 335 may generate a mask for the embedded target video 155 for each of the link videos 200. The mask type 405, mask location 410, mask dimension 415, mask shape 416, mask motion 417, mask mark in 420, and/or mask mark out 425 may be specified by the mask script 285.

The mask may be inserted over a loop of the target video 155 specified by the preview length 247 and the preview start time 248. For example, the target video 105 may be rendered followed by a loop of the target video 105 specified by the preview length 247 and the preview start time 248. The loop may repeat, along with the mask.

The navigation link generator 130 may communicate 530 the embedded target video 155 and the annotation script 280 to the annotation generator 340. The navigation link generator 130 may communicate 530 the embedded target video 155 and the annotation script 280 by uploading the embedded target video 155 and the annotation script 280 to the content host 145.

The annotation generator 340 may annotate 535 the annotated embedded target video 160 using the target video 155 and the annotation script 280. The annotation script 280 may specify a link location for a navigation link overlaid on the annotated embedded target video 160 using the annotation location 435, the annotation dimension 440, the annotation motion 441, the annotation mark in 445, and the annotation mark out 450. As a result, the navigation link is active over a link video 220 and/or other template element 380. A web browser may navigate 530 to the navigation link in response a selection such as a mouse click at the link location.

The selection module 320 may add 540 the annotated embedded target video 160 to a target playlist and the method 500 ends. In one embodiment, the playlist is the target playlist 243 of the video characteristic 224. Alternatively, the selection module 320 may identify the target playlist as a function of the target tags 255 of the video characteristic 224. The selection module 320 may add the annotated embedded target video 160 to the identified target playlist.

Figure 8:
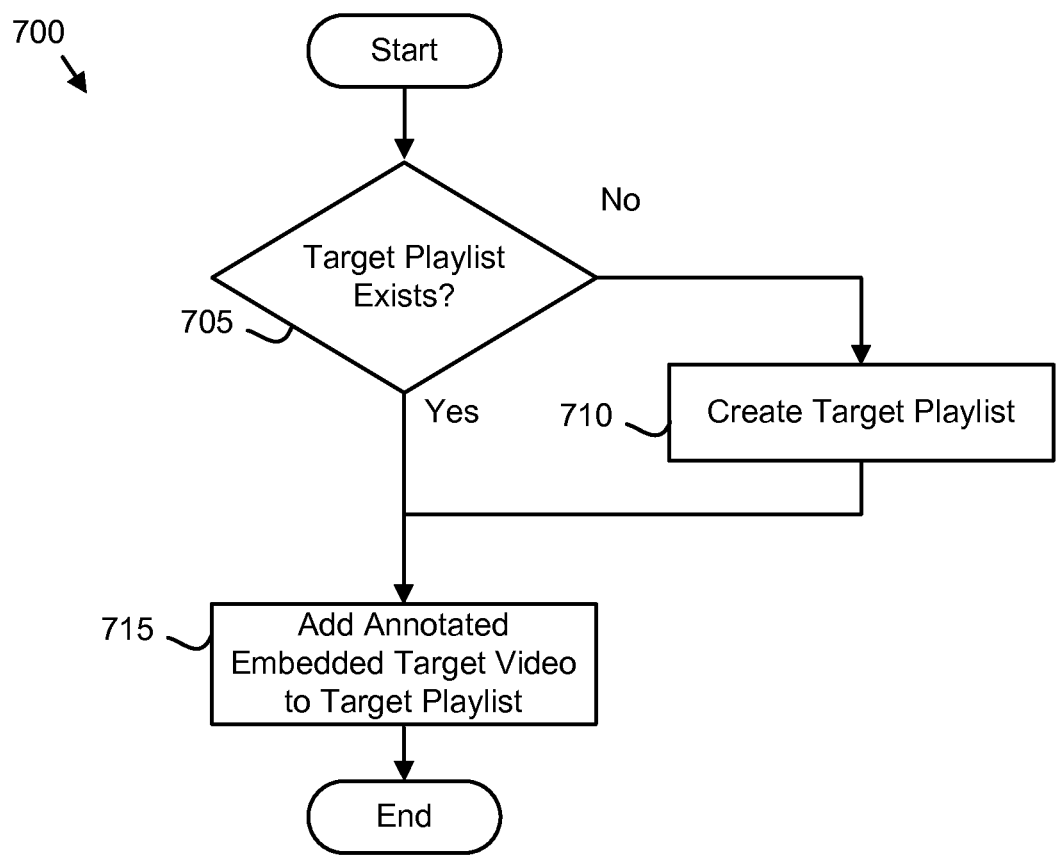
FIG. 8 is a schematic flow chart diagram illustrating one embodiment of a play list addition method.

FIG. 8 is a schematic flow chart diagram illustrating one embodiment of a play list addition method 700. The method 700 may perform the functions of the add to playlist step 540 described for FIG. 7. The method 700 may be performed by the processor 305. Alternatively, the method 500 may be performed by a computer program product comprising a computer readable storage medium such as the memory 310 storing program code that is executable by the processor 305 to perform the functions of the method 700.

The method 700 starts, and in one embodiment, the selection module 320 determines 705 if a target playlist 243 exits. The selection module may query the target playlist 343 of the video characteristic 224 to determine 705 if the target playlist 243 exists.

If the target playlist 243 does not exist, the selection module 320 may create 710 the target playlist 243. The selection module 320 may create the target playlist 243 as a function of the target tags 255 of the video characteristic 224. In a certain embodiment, the selection module 320 creates 710 the target playlist 243 as a function of the target description 253. For example, the identified playlist may include keywords matching keywords of the target description 253. Alternatively, the selection module 320 may create 710 the target playlist 243 as a function of the related videos 257. For example, the target playlist 243 may be selected as a playlist that includes the related videos 257. Alternatively, the selection module 320 may create 710 the playlist as a function of the related genre 259. For example, the target playlist 243 may be a playlist for the related genre 259. The selection module further adds 715 the annotated embedded target video 160 to the target playlist 243 and the method 700 ends.

Figure 9A:
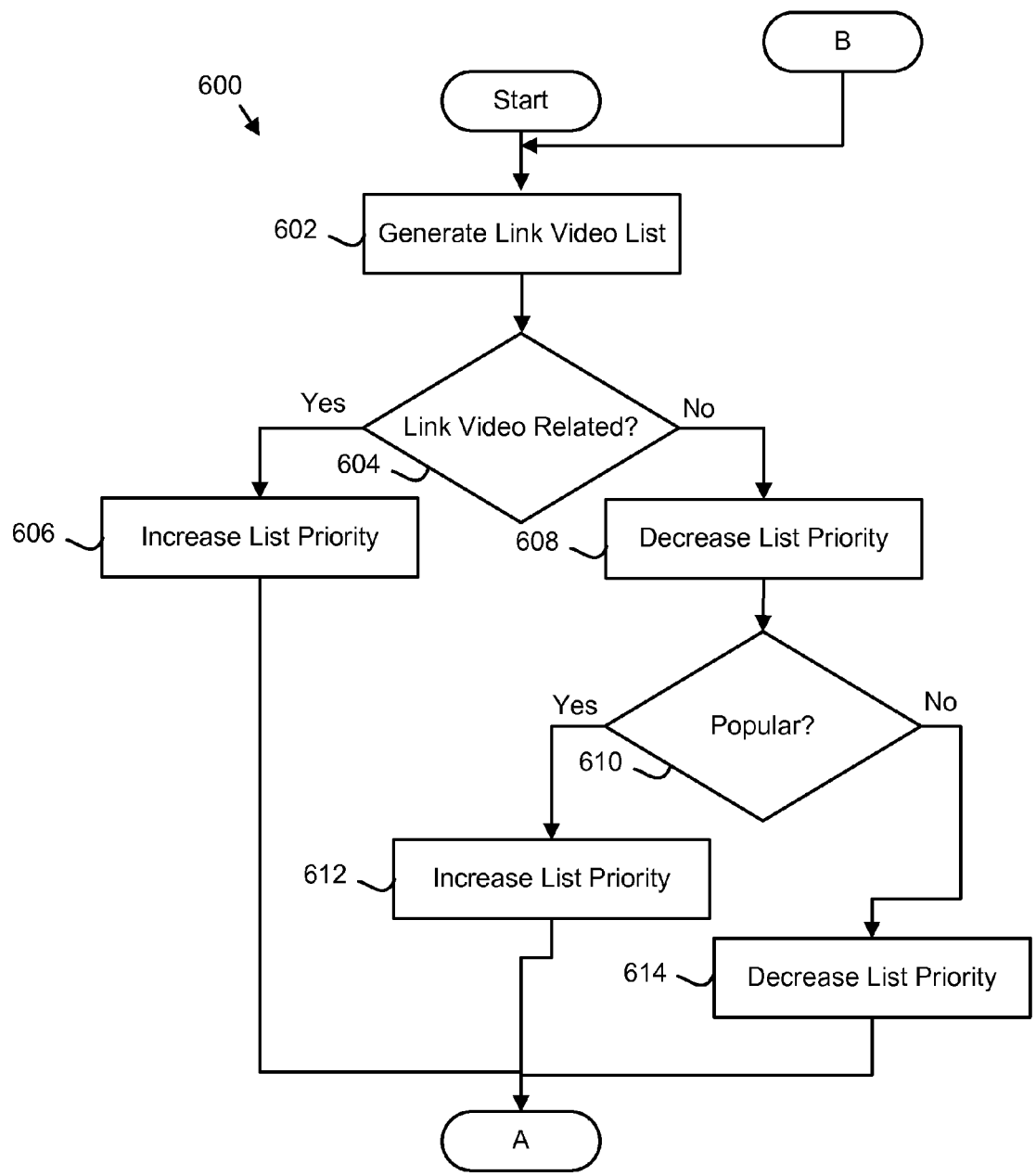
FIGS. 9A-B are schematic flow chart diagrams illustrating one embodiment of a link video selection method.
Figure 9B:
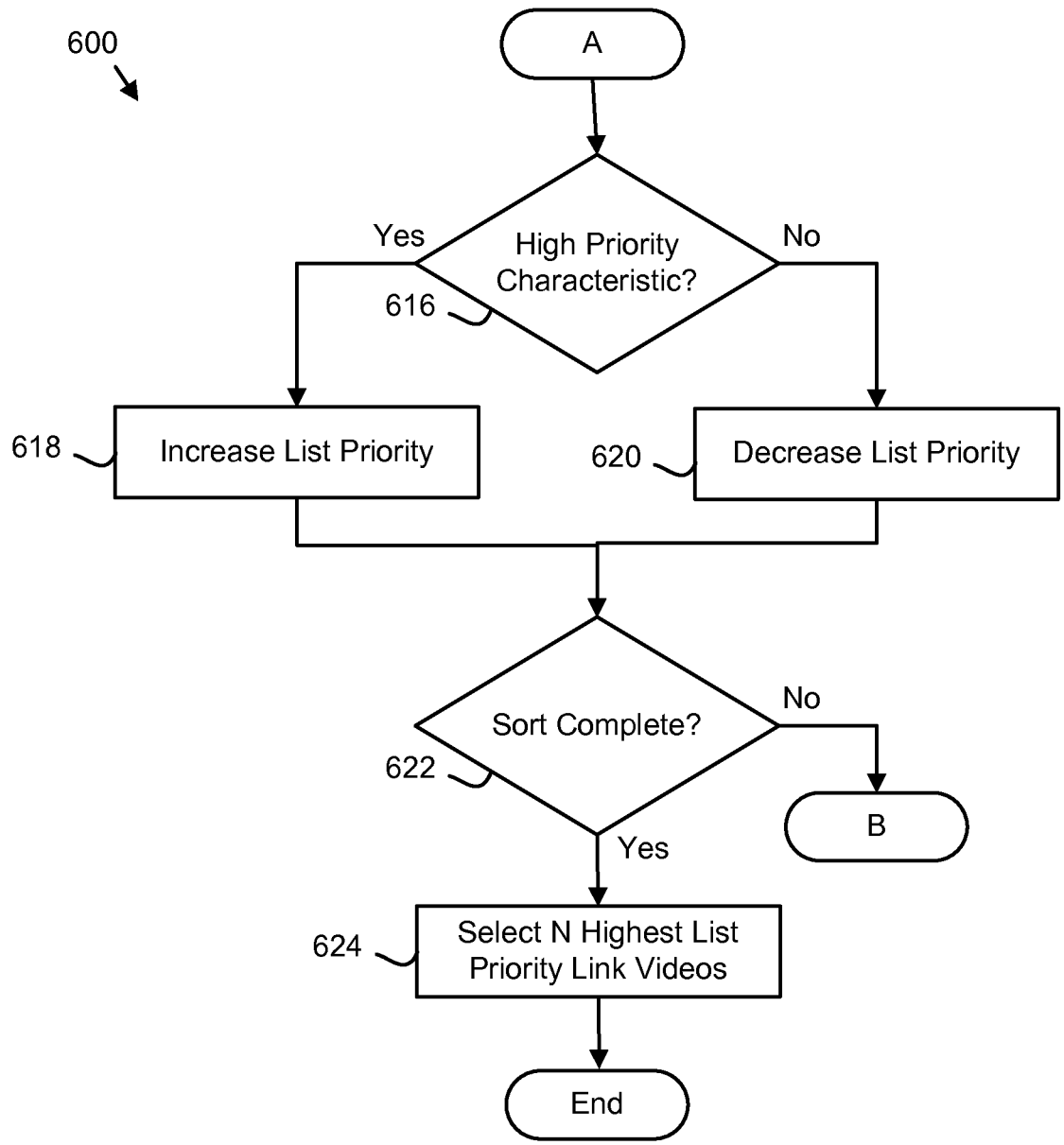

FIGS. 9A-B are schematic flow chart diagrams illustrating one embodiment of a link video selection method 600. In one embodiment, the link video selection method 600 is embodied in the generate link video list step 505 and the select link video step 510 of FIG. 7. The method 600 may be performed by the processor 305. Alternatively, the method 600 may be performed by a computer program product comprising a computer readable storage medium such as the memory 310 storing program code that is executable by the processor 305 to perform the functions of the method 600. The method 600 operates on the link videos 200 of the link video list 240.

The method 600 starts, and in one embodiment the selection module 320 generates 602 the link video list 240. The link video list 240 may include all link videos in the video database 110. Alternatively, the link video list 240 may include link videos 200 with one or more clip characteristics 215 that match one or more of a target gender 241, a target channel 249, target description 253, and/or content characteristics 263 of the target video 105. In a certain embodiment, the link video list 240 includes link videos 200 with tags 218 that match the target tags 255 of the target video 105.

The selection module 320 may further determine 604 if a current link video 200 is related the target video 105. In one embodiment, the current link video 200 is a sequentially selected link video 200 from the link video list 240. In one embodiment, each link video 200 and the link video list 240 is assigned an initial list priority. The initial list priority may be a value such as zero.

In one embodiment, the current link video 200 is related to the target video 105 if one or more clip characteristics 215 of the current link video 200 are included in the target description 253 of the target video 105 and/or the content characteristics 263 of the target video 105. Alternatively, the current link video 200 is related to the target video 105 if the current link video 200 is listed as a related video 257 for the target video 150.

If the current link video 200 is related to the target video 105, the list priority of the current link video 200 is increased 606 by a specified value and the selection module 320 determines 616 if the clip characteristic 215 is a high priority characteristic. If the current link video 200 is not related to the target video 105, the list priority of the current link video 200 is decreased 608 by a specified value and the selection module 320 determines 610 if the current link video 200 is popular.

In one embodiment, the clip characteristic 215 is a high priority characteristic if the priority 297 for the characteristic type 296 of the clip characteristic 215 exceeds a priority threshold. In addition, the current link video 200 may be popular if the popularity 211 of the current link video 200 exceeds a popularity threshold.

If the current link video 200 is popular, the selection module 320 increases 612 the list priority of the current link video 200 by a specified value, and the selection module 320 determines 616 if the clip characteristic 215 is a high priority characteristic. If the current link video 200 is not popular, the list priority of the current link video 200 is decreased 614 by a specified value, and the selection module 320 determines 616 if the clip characteristic 215 is a high priority characteristic.

If the clip characteristic 215 of the current link video 200 is a high priority characteristic, the list priority of the current link video 200 is increased 618 by a specified value while if the clip characteristic 215 is not a high priority characteristic, the list priority of the current link video 200 is decreased 620 by specified value.

The list priority of each link video 200 in the link video list 240 sorts the link video list 240, the list priority ranking each link video 200 in the sort. The selection module 320 determines 622 if the sort of the link video list 240 is complete. In one embodiment, the sort is complete if all link videos 200 have been evaluated for priority. If the sort is not complete, the selection module 320 determines 604 if a new current link video 200 from the link video list 240 is related to the target video 105.

If the sort is complete, the selection module 320 selects at least one link video 200 from the link video list 240 according to the policy 115. In one embodiment, the selection module 320 selects the N highest list priority link videos 200, where N is a nonzero integer, and the method 600 ends. For example, the selection module 320 may select four highest list priority link videos 200.

Figure 10A:
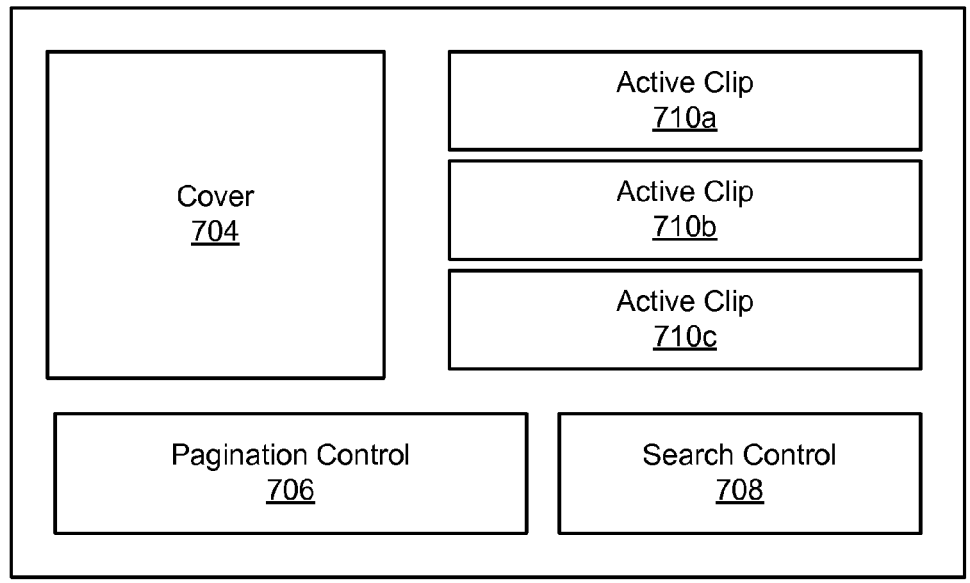
FIG. 10A is a schematic block diagram illustrating one embodiment of a post roll layout.

FIG. 10A is a schematic block diagram illustrating one embodiment of a post roll layout 700a. The layout 700a includes a cover 704, active clips 710, a pagination control 706, and a search control 708. The pagination control 706 may include the navigation link for each selected link video 200. In one embodiment, the pagination control 706 overlays the annotated embedded target video 160. The pagination control 706 may link to a plurality of page segments. Each page segment may embed a plurality of navigation links.

In one embodiment, each active clip 710 includes one or more of a video clip 210, an image 217, a video title 207, and a tag 218. The active clip 710 may be rendered within the target video 105 as the embedded target video 155. In addition, navigation links to link videos 200 may be overlaid on the embedded target video 155 to form the annotated embedded target video 160.

The cover 704 may display the image 217. The image 217 may be a movie poster, promotional image, or the like. A navigation link may be overlaid on the cover 704. The search 708 may comprise a text search box. In one embodiment, a user may enter one or more search terms into the text search box. The search control 708 may receive a search term and execute a search within the content host 145. In one embodiment, the search is restricted to content of the content provider 140.

Figure 10B:
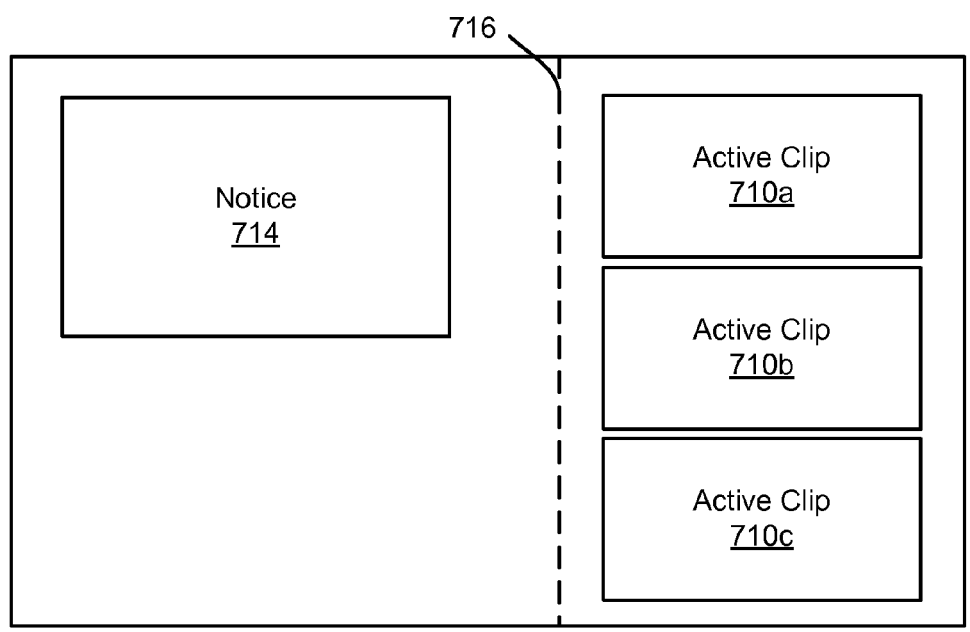
FIG. 10B is a schematic block diagram illustrating one alternate embodiment of a post roll layout.

FIG. 10B is a schematic block diagram illustrating one embodiment of a post roll layout 700b. The post roll layout 700b includes a notice 714. The notice 714 may be embedded in the embedded target video 155. Alternatively, the notice 714 may be generated as an annotation specified by the annotation script 280 and displayed as part of the annotated embedded target video 160. In one embodiment, navigation link is overlaid the notice 714 in the annotated embedded target video 160.

In one embodiment, the notice 714 and the active clips 710 are displayed on opposite sides of a vertical axis 716. Alternatively, the notice 714 and the active clips are displayed on opposite sides of a horizontal axis (not shown)

Figure 10C:
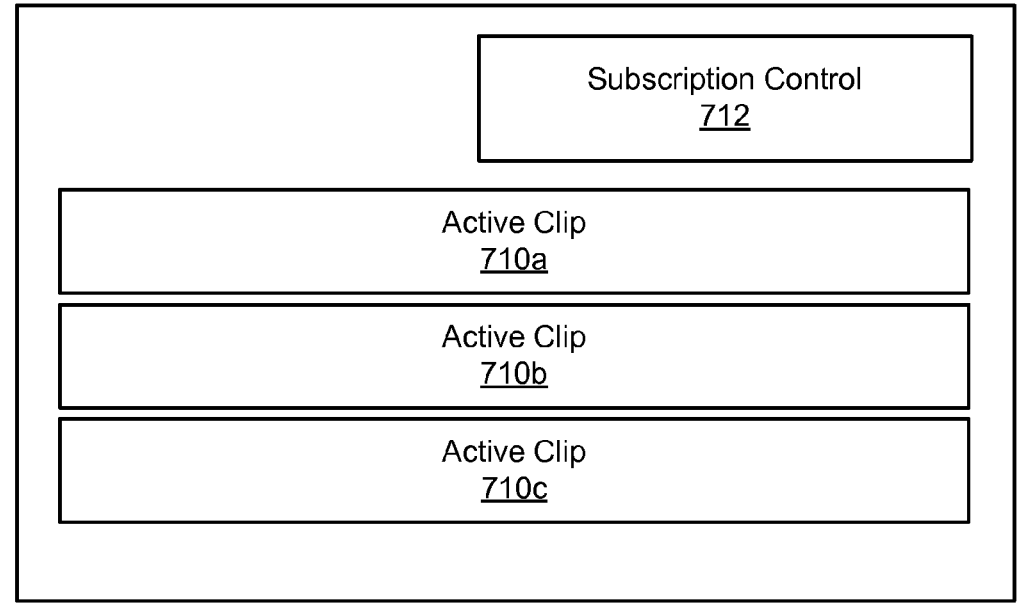
FIG. 10C is a schematic block diagram illustrating one alternate embodiment of a post roll layout.

FIG. 10C is a schematic block diagram illustrating one alternate embodiment of a post roll layout 700c. The post roll layout 700c includes a subscription control 712. The subscription control 712 may allow user to subscribe to a channel. In one embodiment, the subscription control 712 includes an image that is embedded in the embedded target video 155 in response to the mask script 285. Alternatively, the subscription control 712 includes a text and/or image that is overlaid on the embedded target video 155 in response to the annotation script 280. The active clips 710 are depicted as arranged horizontally below the subscription control 712.

Figure 10D:
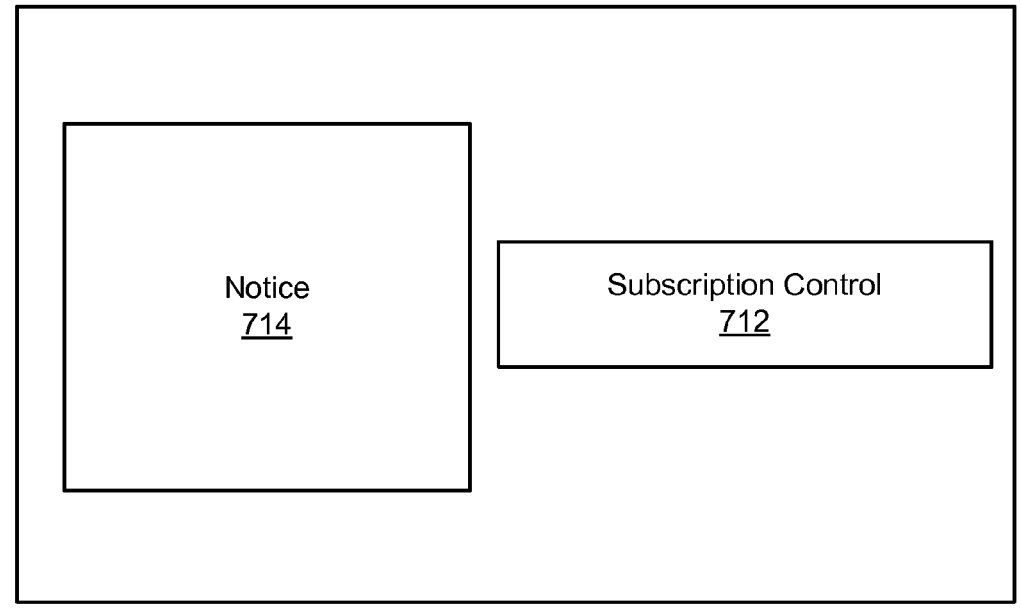
FIG. 10D is a schematic block diagram illustrating one alternate embodiment of a post roll layout.

FIG. 10D is a schematic block diagram illustrating one alternate embodiment of a post roll layout 700d. In the depicted embodiment, the post roll layout 700d includes the notice 714 and the subscription control 712. In an alternate embodiment, the layout 700d may include a cover 704 and the subscription control 712.

Figure 10E:
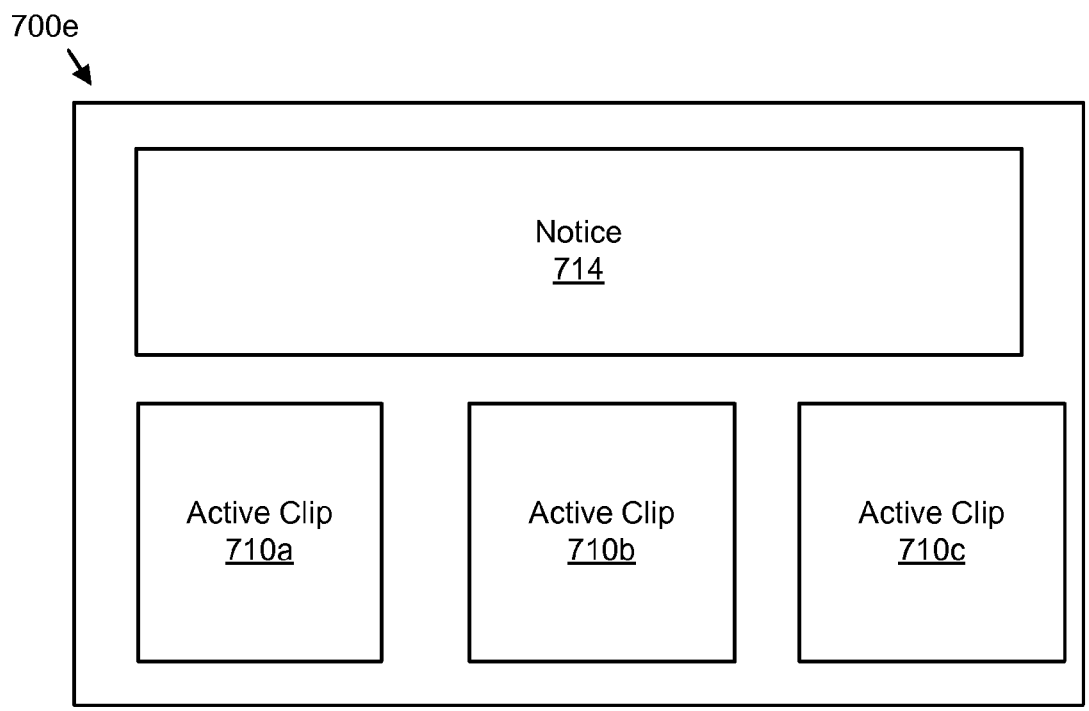
FIG. 10E is a schematic block diagram illustrating one alternate embodiment of a post roll layout.

FIG. 10E is a schematic block diagram illustrating one alternate embodiment of a post roll layout 700e. In the depicted embodiment, a plurality of active clips 710 are displayed below and noticed 714. In one embodiment, sequences of active clips 710 may be displayed sequentially. For example, the motion data 367 may specify scrolling the active clips 710 from left to right and/or right to left.

INDUSTRIAL APPLICABILITY

Providing video content through content hosts 145 such as YOUTUBE® often requires the preparation and posting of large numbers of videos. The extensive processing needed to embed video clips and other objects annotated with navigation links is often impractical and not economical for such large numbers of videos. Automating the processing of videos, especially pre and post roll production makes the preparation and processing of large numbers of videos practical and economical.

The embodiments automatically generate the link video list 240 and select at least one link video 200 from the link video list 240. In addition, the embodiments generate the mask script 285 and the annotation script 280 that are used to automatically generate the annotated embedded target video 160 from the target video 105 and the link video list 240. As a result, the target video 105 may be automatically embedded with the link videos 200 and annotated with navigation links to the link videos 200. The embodiments support the automatic post roll production of the target video 105.

The embodiments generate the link video list 240 and select a link video 200 from the link video list 240, automating the selecting of the link videos 200. In addition, the embodiments generate the mask script 285 and the annotation 280 that are used to generate the embedded target video 155 and the annotated target video 160. As a result, the embodiments automate the post roll product of the target video by embedding and annotating related link videos 200. As a result, users are presented with the related videos annotated with navigation links to those videos where the navigation links are most likely to be acted on.

As a result, a large numbers of video can be efficiently and economically processed to include video clips 210, covers 704, notices 714, pagination controls 706, search controls 708, subscription controls 712, and the like that further enhance the value of the posted videos. Therefore, both the number and the value of videos that can be posted is increased, making the processing and posting of videos more economical and more profitable.

The embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

The invention claimed is:

1. A method for automated post roll production, the method comprising:
generating, by use of a processor, a link video list from a video database, wherein each link video in the link video list comprises at least one clip characteristic matching a video characteristic of a target video and each link video is associated with a video clip and a video address;
selecting a link video from the link video list according to a policy;
generating a mask script that specifies a mask dimension equal to a clip dimension of the link video, a mask mark in, a mask mark out, and a mask location of the video clip of the selected link video within the target video, and further specifies a dimension, a mark in, and a location of a pagination control;
generating an annotation script that specifies an annotation type, a link location, an annotation dimension, an annotation motion, an annotation mark in, and an annotation mark out for a navigation link, and further specifies the dimension, the mark in, and the location of the pagination control;
rendering the video clip of the selected link video embedded within the target video as an embedded target video in response to the mask script;
communicating the embedded target video and the annotation script to an annotation generator; and
annotating the embedded target video with the video address at the link location in response to the annotation script.

2. The method of claim 1, wherein the policy selects a highest ranking link video from the link video list sorted by current video, popular video, and high priority characteristic.

3. The method of claim 1, the method further comprising generating a video template that specifies the clip dimension, a clip mark in, and a clip location.

4. The method of claim 1, wherein the video characteristic comprises an actor in the target video, a product placement in the target video, a dialog segment of the target video, a promotion for the target video, an award for the target video, a poster for the target video, and a scene of the target video.

5. The method of claim 1, wherein the navigation link is selected from the group consisting of a link to the selected link video, a link to a play list, a link to a channel, a link to a page, a link to a profile, a link to a subscription option, and a link to a project.

6. A program product comprising a non-transitory computer readable storage medium that stores code executable by a processor to perform:
generating a link video list from a video database, wherein each link video in the link video list comprises at least one clip characteristic matching a video characteristic of a target video and each link video is associated with a video clip and a video address;

selecting a link video from the link video list according to a policy;

generating a mask script that specifies a mask dimension equal to a clip dimension of the link video, a mask mark in, a mask mark out, and a mask location of the video clip of the selected link video within the target video, and further specifies a dimension, a mark in, and a location of a pagination control;

generating an annotation script that specifies an annotation type, a link location, an annotation dimension, an annotation motion, an annotation mark in, and an annotation mark out for a navigation link, and further specifies the dimension, the mark in, and the location of the pagination control;

rendering the video clip of the selected link video embedded within the target video as an embedded target video in response to the mask script;

communicating the embedded target video and the annotation script to an annotation generator; and annotating the embedded target video with the video address at the link location in response to the annotation script.

7. The program product of claim 6, wherein the policy selects a highest ranking link video from the link video list sorted by current video, popular video, and high priority characteristic.

8. The program product of claim 6, the processor further generating a video template that specifies the clip dimension, a clip mark in, and a clip location.

9. The program product of claim 6, wherein the mask script further specifies a dimension, a mark in, and a location of a pagination control and the annotation script further specifies a dimension, a location, and a mark in of the pagination control.

10. The program product of claim 6, wherein the video characteristic comprises an actor in the target video, a product placement in the target video, a dialog segment of the target video, a promotion for the target video, an award for the target video, a poster for the target video, and a scene of the target video.

11. The program product of claim 6, wherein the navigation link is selected from the group consisting of a link to the selected link video, a link to a play list, a link to a channel, a link to a page, a link to a profile, a link to a subscription option, and a link to a project.

12. An apparatus comprising:

a processor;

a non-transitory computer readable storage medium storing program code executable by the processor to perform:

generating a link video list from a video database, wherein each link video in the link video list comprises at least one clip characteristic matching a video characteristic of a target video and each link video is associated with a video clip and a video address;

selecting a link video from the link video list according to a policy;

generating a mask script that specifies a mask dimension equal to a clip dimension of the link video, a mask mark in, a mask mark out, and a mask location of the video clip of the selected link video within the target video, and further specifies a dimension, a mark in, and a location of a pagination control;

generating an annotation script that specifies an annotation type, a link location, an annotation dimension, an annotation motion, an annotation mark in, and an annotation mark out for a navigation link, and further specifies the dimension, the mark in, and the location of the pagination control;

rendering the video clip of the selected link video embedded within the target video as an embedded target video in response to the mask script;

communicating the embedded target video and the annotation script to an annotation generator; and annotating the embedded target video with the video address at the link location in response to the annotation script.

13. The apparatus of claim 12, wherein the policy selects a highest ranking link video from the link video list sorted by current video, popular video, and high priority characteristic.

* * * * *